April 10, 1962 O. G. BURCH ET AL 3,028,652
APPARATUS FOR AND METHOD OF MANUFACTURING
CELLULAR SILICATE SLABS
Filed Jan. 13, 1958 3 Sheets-Sheet 1

INVENTORS
OSCAR G. BURCH
WILBUR A. SCHACH
BY
Rule and Hoge
ATTORNEYS

April 10, 1962 O. G. BURCH ET AL 3,028,652
APPARATUS FOR AND METHOD OF MANUFACTURING
CELLULAR SILICATE SLABS
Filed Jan. 13, 1958 3 Sheets-Sheet 2
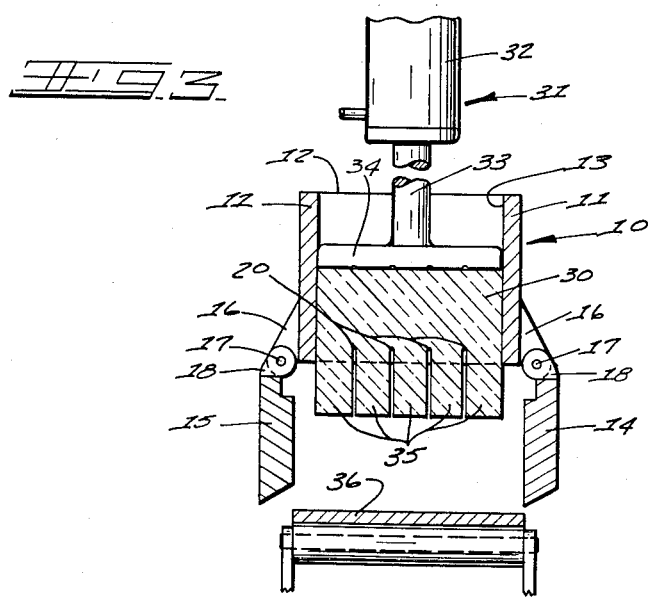
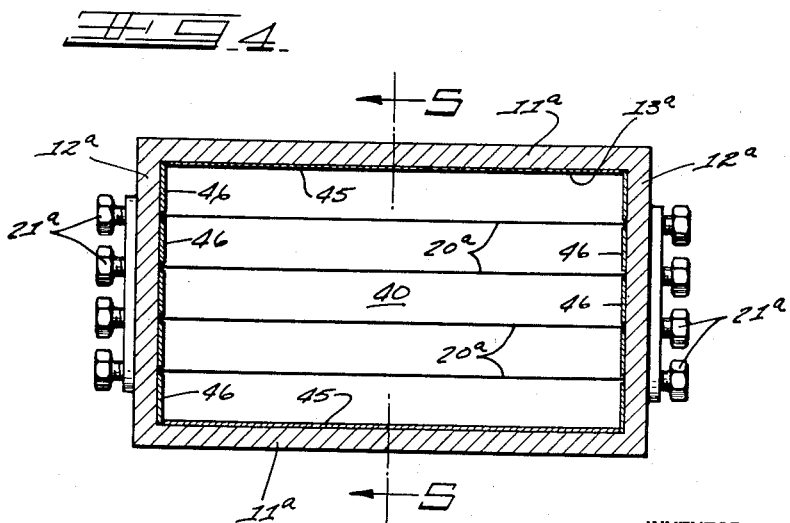
INVENTORS
OSCAR G. BURCH
WILBUR A. SCHAD
BY
Rule and Hoge
ATTORNEYS April 10, 1962 O. G. BURCH ET AL 3,028,652
APPARATUS FOR AND METHOD OF MANUFACTURING
CELLULAR SILICATE SLABS
Filed Jan. 13, 1958
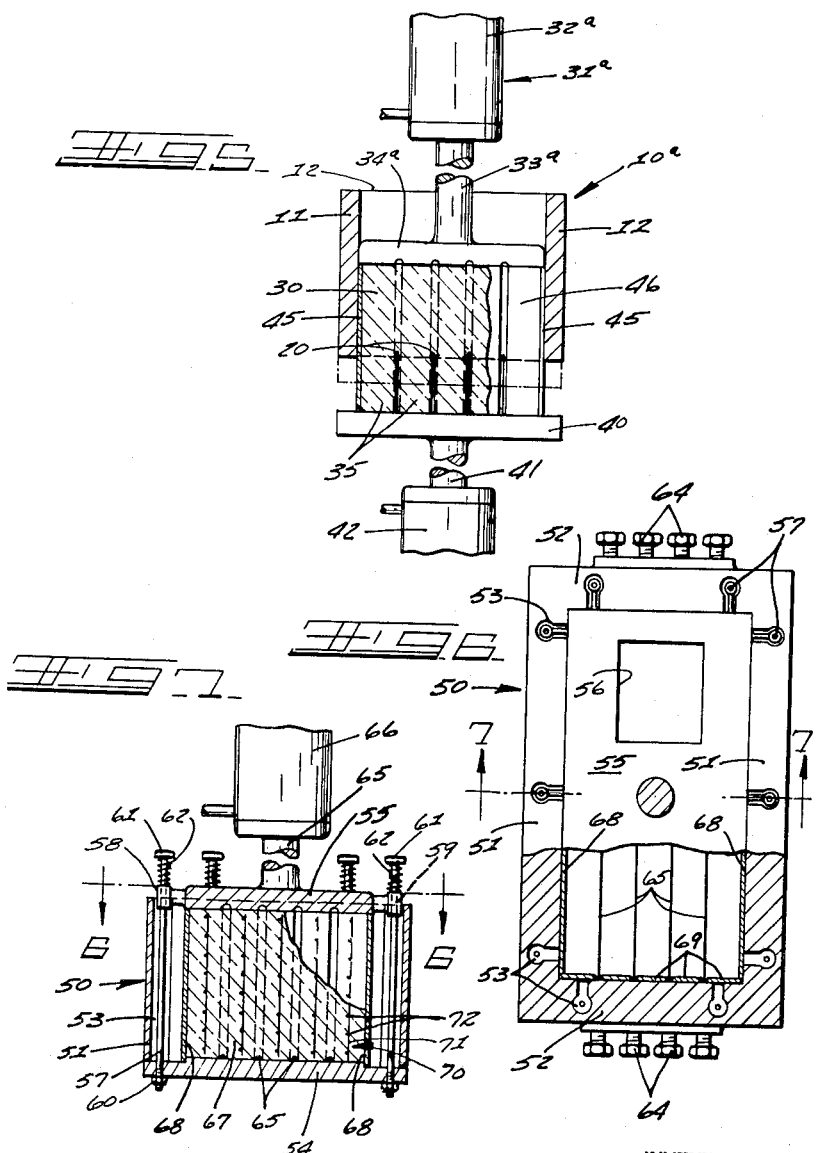

United States Patent Office 3,028,652
Patented Apr. 10, 1962

3,028,652
APPARATUS FOR AND METHOD OF MANUFACTURING CELLULAR SILICATE SLABS
Oscar G. Burch, Toledo, and Wilbur A. Schaich, Maumee, Ohio, assignors to Owens-Illinois Glass Company, a corporation of Ohio
Filed Jan. 13, 1958, Ser. No. 708,562
4 Claims. (Cl. 25—122)

The present invention proposes an apparatus for manufacturing cellular silicate slabs for roof decking, walls, and other structural uses.

More particularly, this invention contemplates new improvements in molding and slicing apparatus, whereby a cake of light-weight "foamed concrete" is formed into a plurality of separate and individual structural slabs.

Formulations or slurries for cellular concrete as utilized in a typical commercial process, may utilize cement, silica-flour or a similar pozzolan, quick-lime, and a foaming agent, such as a commercial foaming agent in a 3% solution. After stirring and mixing of the slurry, the foamed casting mix is poured into a mold for pre-curing at ambient pressures and temperatures for a period of about eight hours, following which the pre-cured cast block is severed into slabs and the slabs are autoclaved for a period of about ten hours at a steam pressure of about 150 lbs. per square inch to form a finished product having a density of about 30 to 40 lbs. per cubic foot.

The present invention is concerned primarily with the technique of severing the block into slabs after the block or cake has been pre-cured.

Briefly, the apparatus of the present invention comprises a multi-slap mold wherein a cake of cellular concrete is formed by a pre-curing procedure such as that above-described. One wall of the mold is displaceable to accommodate removal of the cake from the mold interior, power means are preferably provided for displacing the cake from the mold, and a plurality of severing wires for forming the slabs are carried by the mold and cast in situ in the slurry prior to its pre-curing. Displacement of the cake relative to the mold will push the cake through the fixed wires to sever the cake into slabs of the desired size.

One particular feature of the present invention resides in the provision of "slip plates." These slip plates are interposed between the cake and the mold walls to provide the more ready egress of the block or cake from the mold. More specifically, the mold inner surfaces are lined with individual plates prior to the casting of the slurry, the slurry then is hardened and pre-cured in contact with the slip plates, rather than in contact with the mold wall, and the slip plate-cake assembly is displaced from the mold by the power means. Once the cake is free of the mold, the slip plates are removed from the exterior of the cake, and the cake slabs are then ready for autoclaving or a final curing.

Moreover, the present invention contemplates the casting of the slurry into the mold, preferably against the slip plates, the casting of the severance wires in situ in the slurry, the pre-curing of the slurry to form the partially cured cake, the displacement of the cake (and the slip plates, if any) relative to the mold to push the cake through the fixed cutting wires, and the final curing of the individual slabs thus formed, as by autoclaving or other suitable curing procedures.

It is, therefore, an important object of the present invention to provide a new and improved apparatus for the manufacture of cellular silicate slabs.

Another important object of this invention is the provision of an improved apparatus for manufacturing cellular silicate slabs by the severance of a multi-slab cake into individual slabs during relative movement of the cake and the mold in which it is formed.

It is a further object of this invention to provide an apparatus for the manufacture of cellular silicate slabs including a mold, a displaceable wall for the mold, and a plurality of severing wires positioned adjacent the mold displaceable wall and effective to sever a cake issuing through the displaceable wall.

Yet another object is the provision of an apparatus for making slabs of cellular silicate material from a multi-slab cake by the displacement of the cake from the mold and relative to a plurality of severing wires carried by the mold.

Yet another important object of this invention is the provision of a plurality of slip plates interposed between a mold wall and a body of cellular silicate cast into the mold, the slip plates reducing the frictional drag between the cake and the mold walls to facilitate removal of the cake from the mold, and the slip plates being readily removable from the cake after its displacement from the mold.

On the drawings:

FIG. 3 is a view similar to FIG. 2 illustrating the means for removing the cake from the mold;

FIG. 4 is a sectional plan view illustrating a modified form of mold;

FIG. 5 is a sectional view taken along the plane 5—5 of FIG. 4 illustrating the utilization of the mold of FIG. 4;

FIG. 6 is a plan view, with parts broken away and in section, of still another modified form of mold; and FIG. 7 is a sectional view taken along the plane 7—7 of FIG. 6.

As shown on the drawings:

Figure 1:
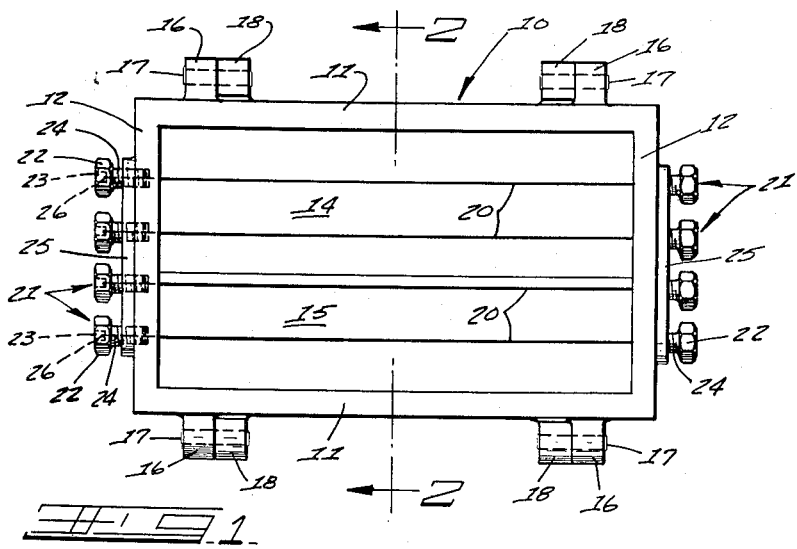
FIG. 1 is a plan view of an apparatus of the present invention.

In FIG. 1, reference numeral 10 refers generally to a mold of the present invention comprising side walls 11 and end walls 12 which are secured together to form an open-ended box and to enclose an interior mold space 13. This interior mold space is open at the top (FIG. 2) and is closed at its bottom by a pair of hinged bottom plates 14 and 15, respectively, each of which is hinged to the associated side wall 11 at a plurality of locations.

For example, the side walls carry hinge plates 16 connected through a pintle or pin 17 to similar plates 18 carried by the bottom wall sections 14 and 15, respectively. The bottom wall portions 14 and 15 are secured together by suitable means, as by a latch indicated generally at 19.

Interiorly of the mold space 13 and extending longitudinally thereof are a plurality of cutting wires 20 formed of high tensile strength material, such as steel or the like. These cutting wires 20 are retained in screw-type chucks indicated generally at 21. More particularly, the chucks 21 each comprise a bolt 22 having a recessed head 23 and a threaded shank 24 which is threadedly received by an end plate 25 carried by each of the end walls 12 adjacent the lower extremities thereof and which are provided with interiorly threaded apertures into which the threaded shanks of the bolts 22 extend. Each end of each of the wires 20 is provided with a transversely extending locking pin 26, or the like, which is retained within the recess 23 of the bolt head. By the threaded adjustment of the chucks 21, the wires 20 are maintained under tension for a purpose to be hereinafter more fully described.

The mold space 13 is filled with an aqueous foamed silicate slurry. Such a slurry may comprise 28.6% high early cement, 66.5% silica-flour, 4.9% quick lime, calcium chloride in an amount equal to 2% by weight of the cement, water sufficient to yield a water to solids ratio of about 0.75:1 by weight and a 3% aqueous solution of a commercial foaming agent sold under the trade name "National Foam Liquid," the foaming agent being present in an amount equivalent to 0.016 gallon of foaming agent per 100 lbs. of slurry.

Figure 2:
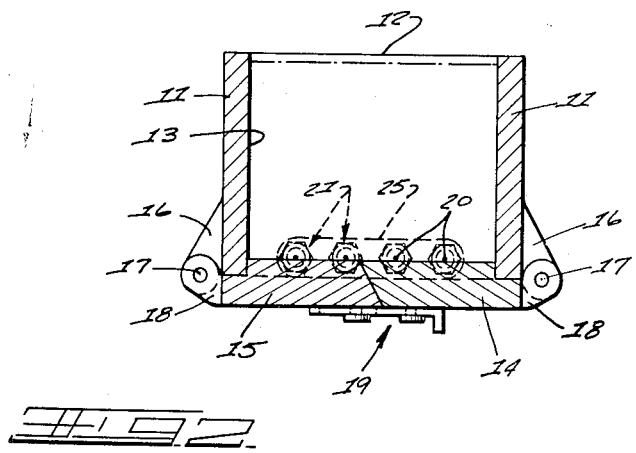
FIG. 2 is a sectional view taken along the plane 2—2 of FIG. 1.

This slurry is introduced into the mold space 13 when the mold bottom plates 14 and 15 are in their closed position of FIG. 2 and the latch 19 is secured. This slurry is next pre-cured at ambient conditions to an extent such that the cake or body of slurry is self-sustaining, a period usually requiring from 6 to 8 hours under atmospheric conditions of temperature and pressure.

It will be noted from FIGS. 1, 2 and 3, that the resultant cake is of multi-slab dimensions. That is, the cake is of unit slab length and breadth, as determined by the length and height of the mold space 13, but of multi-slab thickness, as determined by the width of the mold space 13.

The cutting wires 20 are preferably spaced apart from one another and from the mold side walls 11 through a distance equivalent to the thickness of a desired individual slab.

Following the solidification of the cake, the cake is displaced longitudinally through the open mold bottom defined by the released lower wall panels 14 and 15. This operation is illustrated in FIG. 3 of the drawings, wherein it will be seen that the pre-cured cake 30 is contacted at its upper exposed surface, through the open top of the mold 10 by power discharge device indicated generally at 31 and preferably comprising a fluid pressure actuated cylinder 32, either hydraulically or pneumatically actuated, and having an extensible and retractable piston 33 operatively connected to a mold plate 34. This mold plate 34 fits snugly within the interior dimensions of the mold space 13 and actuation of the power device 31 extends the piston 33 and depresses the molding cake 30 by contact of the mold plate 34 with the cake 30. The molded cake 30 is thus displaced through the open bottom of the mold, the displacement of the cake effecting relative movement between the cake 30 and the cutting wires 20. Due to the prehardened condition of the cake 30, the displacement of the cake relative to the cutting wires 20 will sever the cake into individual slabs 35 which are then removed from the mold and placed or dropped onto a suitable conveying surface 36.

It will be understood that the present invention comprises the formation of the slurry, the casting of the slurry into a multi-slab mold, the pre-curing of the slurry to form a cellular silicate cake 30, the displacement of the cake relative to the mold through an open side of the mold, and the concurrent severing of the cake into individual slabs by relative movement between the cake 30 and the cutting wires 20.

In that modified form of the invention illustrated in FIG. 4 of the drawings, the suffix "a" is affixed to those parts of the apparatus which refer to the identical numeral in FIGS. 1 through 3. Thus, the mold is defined by side and end walls 11$^a$ and 12$^a$, and cutting wires 20$^a$ are disposed across the interior mold space 13$^a$, the wires being retained by the chucks 21$^a$, the mold bottom wall is defined by a vertically displaceable plate 40 carried by suitable power means, such as a piston 41 actuated by a fluid pressure cylinder 42.

It has been found that relative movement of the cake 30 and the side and end walls 11 and 12 may tend to cause surface defects, flaws, or tears, in the mold wall-contacting exterior surfaces of the cake. To minimize the occurrence of such surface defects, it has been found advantageous to interpose between the mold walls 11 and 12 and a cake 30 a plurality of slip plates. Such slip plates may comprise side wall plates 45 of a size and contour substantially that of the side walls 11$^a$ and end wall plates 46 of a length equal to the height of the end walls 12$^a$ and of a width corresponding to the width of a finished slab or the distance between the cutting wires 20$^a$.

The utility of such slip plates is well illustrated in FIG. 5 of the drawings, where it will be seen that displacement of the cake from the mold occurs through the opening left by the displaceable bottom mold wall 40 upon actuation of the power means 31$^a$ and including the fluid pressure cylinder 32$^a$, the piston rod 33$^a$ and the mold plate 34$^a$. The frictional drag formerly encountered between the mold and the cake 30 now takes place between the mold side and end walls 11 and 12 and the slip plates 45 and 46. Following complete removal of the cut slabs 35 from the mold 10$^a$, the slip plates are stripped from the vertical side surfaces of the end slabs and from the terminal ends of each of the slabs, and the occurrence of surface flaws and defects is largely avoided. During the severing operation, cylinder 42 is concurrently retracted in synchronism with cylinder 31$a$ so that the bottom of the severed slabs always have some degree of support and do not drop abruptly upon a support surface.

In the third embodiment of the invention illustrated in FIGS. 6 and 7 of the drawings, a mold 50 is provided having side walls 51 and end walls 52. The side and end walls are provided with spaced key hole-shaped apertures 53 which extend vertically throughout the extent of the side and end walls 51 and 52, respectively. The mold bottom is closed by a bottom wall 54 and a mold cover plate 55 is provided, the cover plate having a fill opening 56 formed therein.

The top and bottom mold plates are interconnected by tie-rods 57 which project upwardly from the bottom plate 54 through the vertical apertures 53 and through a vertically apertured embossment 58 carried by the top plate 55. A plurality of such embossments 58 are carried by the top plate (ten such embossments being illustrated in FIG. 6) and each embossment is provided with a vertical aperture 59 through which the tie-rod 57 projects. The tie-rod terminates at its lower end in a nut 60 abutting the under surface of the bottom plate 54 and at its upper end in a radially enlarged head 61. A compression spring 62 is interposed between each of the tie rod heads 61 and the corresponding embossment 58, so that the top and bottom plates are urged toward one another through the compression of the springs 62.

The end walls 52 of the mold 50 carry wire chucks 64 and a plurality of longitudinally extending cutting wires 65 project interiorly across the mold space to closely overlie the bottom plate 54 and to subdivide the interior mold space into unit slab thickness dimensions.

The cover plate 55 is carried by the piston rod 65 of a power unit including a fluid pressure actuated cylinder 66. Upon actuation of the cylinder 66, the piston rod 65 is extended and the cover plate is depressed toward the bottom plate 54 so as to displace both the bottom plate and the cellular silicate cake 67 downwardly within the mold space. During such displacement, the wires 65 sever the cake 67 in the manner hereinbefore described. The top plate 55 contacts slip plates 68 and 69 similar to the slip plates 45 and 46 heretofore described. The weight of the bottom plate 54 and the top plate 55 is supported from the springs 62, although the normal frictional adherence between these slip plates 68, 69 and the side and end mold walls 51, 52 will decrease the actual weight imposed upon these springs 62. Again, some support is provided for the bottom of each slat, but in all illustrated modifications of this invention, the weight of the cake contributes to the slicing operation.

Illustrated in FIG. 7 of the drawings, the finished slabs made by use of all the apparatus and methods herein disclosed normally incorporate therein a reinforcing network or steel grid. Such grids are disposed interiorly of each of the slabs and are positioned vertically within the mold space to lie intermediate the adjacent cutting wires 65. Such grids are indicated generally at 70 and comprise vertical lengths of wire 71 and longitudinal lengths of wire 72, these lengths of wire being joined to one another to form the reinforcing network.

While preferred embodiments have been described above in detail, it will be understood that numerous modifications might be resorted to without departing from the scope of the invention as defined in the following claims.

We claim:

1. An apparatus for the manufacture of slabs of cellular concrete or the like, comprising an open-ended mold, one open end of which is of multi-slab dimension, a plurality of fixed cutting wires traversing the one open end of said mold and spaced at unit slab dimensions, displaceable wall means closing said one open end, a plurality of slip plates lining the open-ended mold, those plates aligned with the cutting wires being spaced to accommodate passage of the cutting wires therebetween, a mold plate having a size and shape which snugly fits within an open end of said mold and which contacts said slip plates and the contents within said mold, and power means associated with said mold plate whereby the latter displaces the contents of the mold and said slip plates toward said one open end.

2. An apparatus for the manufacture of slabs of cellular concrete or the like comprising side and end walls defining an open topped and open bottomed mold space of multiple slab dimensions, displaceable top and bottom walls closing the mold space, tie rods interconnecting said top and bottom walls outside the confines of said mold space, power means for jointly displacing said top and bottom walls and the mold space contents interposed therebetween, a plurality of cutting wires traversing the mold space and closely adjacent that displaceable wall toward which the mold contents are displaced, and slip plates interposed between the side and end walls of the mold and the mold contents, said slip plates also being displaceable with said top and bottom walls by means of said power means.

3. An apparatus for the manufacture of slabs of cellular concrete or the like comprising side and end walls defining an open topped and open bottomed mold space of multiple shape and size and adapted to receive a curable slurry, displaceable top and bottom walls closing the mold space, slip plates interposed between the side and end walls of the mold and the contents of said mold space tie rods interconnecting the top and bottom walls outside the confines of said mold space, a plurality of spaced cutting elements fixed to said mold closely adjacent one of said displaceable walls, power means for jointly displacing said slip plates, said top and bottom walls, and the mold space contents interposed therebetween toward said cutting elements and through a dimension equal to substantially the distance between said top and bottom walls to sever the mold space contents into unit slabs while confined between said top and bottom walls and removing said unit slabs from said top and bottom walls.

4. An apparatus for the manufacture of at least partially cured slabs of concrete, comprising side and end walls enclosing an open topped and open bottomed mold space of multi-slab width and adapted to receive a curable slurry, a plurality of parallel cutting wires extending parallel to said side walls and positioned adjacent the open bottom of the mold at unit-slab dimensions, slip plates in face-to-face abutment with the side and end walls of said mold space, the slip plates engaging the end walls being spaced to accommodate entry of said cutting wires therebetween, a movable bottom wall underlying said side and end walls and closely underlying said cutting wires to close the bottom of said mold space and also generally underlying said slip plates, and a movable top wall for said mold space fitting snugly between said side and end walls and overlying the upper extremities of said slip plates, and power means for displacing said top wall downwardly to displace the slip plates and mold contents toward said movable bottom wall.

References Cited in the file of this patent

UNITED STATES PATENTS

| | | |
|---|---|---|
| 157,831 | Huntington | Dec. 15, 1874 |
| 534,746 | Jarves | Feb. 26, 1895 |
| 628,405 | Gillette | July 4, 1899 |
| 631,557 | Cayouette | Aug. 22, 1899 |
| 667,251 | Powter et al. | Feb. 5, 1901 |
| 1,405,671 | Crozier | Feb. 7, 1922 |
| 1,420,796 | Warner | June 27, 1922 |
| 1,580,519 | Meyer | Apr. 13, 1926 |
| 1,608,690 | Ashenhurst | Nov. 30, 1926 |
| 2,181,618 | Bole et al. | Nov. 28, 1939 |
| 2,489,069 | Adams et al. | Nov. 22, 1949 |
| 2,489,504 | Schlude | Nov. 29, 1949 |
| 2,569,469 | Gersten et al. | Oct. 2, 1951 |
| 2,692,430 | Kraft et al. | Oct. 26, 1954 |
| 2,694,846 | Olsson | Nov. 23, 1954 |
| 2,760,248 | Hensgen et al. | Aug. 28, 1956 |